(12) United States Patent
Goyal et al.

(10) Patent No.: US 8,402,552 B2
(45) Date of Patent: Mar. 19, 2013

(54) SYSTEM AND METHOD FOR SECURELY ACCESSING MOBILE DATA

(75) Inventors: Arvind Goyal, Sudbury, MA (US); Joseph Muthian George, Boston, MA (US)

(73) Assignee: Antenna Vaultus, Inc., Jersey City, NJ (US)

( * ) Notice: Subject to any disclaimer, the term of this patent is extended or adjusted under 35 U.S.C. 154(b) by 965 days.

(21) Appl. No.: 12/350,135

(22) Filed: Jan. 7, 2009

(65) Prior Publication Data
US 2009/0240947 A1 Sep. 24, 2009

Related U.S. Application Data

(60) Provisional application No. 61/019,468, filed on Jan. 7, 2008.

(51) Int. Cl.
*G06F 7/04* (2006.01)

(52) U.S. Cl. ......................................................... 726/27

(58) Field of Classification Search ..................... 726/27
See application file for complete search history.

(56) References Cited

U.S. PATENT DOCUMENTS

| 6,427,073 B1* | 7/2002 | Kortesalmi et al. | ........ 455/414.1 |
| 2006/0041751 A1* | 2/2006 | Rogers et al. | ................. 713/171 |
| 2008/0070549 A1* | 3/2008 | Wang | ............................ 455/411 |

* cited by examiner

*Primary Examiner* — Cordelia Zecher
(74) *Attorney, Agent, or Firm* — Paul J. Sutton; Barry G. Magidoff

(57) ABSTRACT

The present invention provides a system and method for maintaining secure information on mobile devices and that balances security and convenience in the provision of mobile data access. Security is maintained by extending the use of industry-accepted two-factor authentication methods, and convenience is enhanced by utilizing a user's existing mobile device accessories as an authentication factor. As a result, the present invention provides a strong authentication system and method without the cost or burden of requiring the user to acquire additional hardware for security purposes.

13 Claims, 5 Drawing Sheets

SYSTEM AND METHOD FOR SECURELY ACCESSING MOBILE DATA

CROSS REFERENCE TO RELATED APPLICATIONS

This application claims the benefit under 35 U.S.C. §119 (e) of U.S. Provisional Application No. 61/019,468, filed on Jan. 7, 2008, the complete disclosure of which is incorporated herein by reference in its entirety.

FIELD OF THE INVENTION

The present invention generally relates to a system and method for maintaining secure information on mobile devices while maintaining user convenience in accessing mobile data.

BACKGROUND OF THE INVENTION

Existing mobile data access systems, such as the system and method described by U.S. Patent Pub. No. 2008/0134347 A1, provide security of on-device data by utilizing a lease key. The lease key acts as a temporary security token on a mobile device that can grant access to data that has been downloaded to the same mobile device. A lease key is issued to a mobile device, and permission to download the data to the mobile device is granted only when the user has authenticated successfully to the data provider.

Specifically, a backend security process is established whereby a specific user is associated with a specific mobile device and also associated with access permissions to particular dataset(s).

The user connects to the backend infrastructure from the assigned device and initiates a procedure that authenticates the user/device pair to the backend infrastructure and allows the creation of an initial lease key and the download of a requested dataset. The lease key is a data structure that incorporates both the public key that is be used to decrypt the data and an expiration date/time after which it cannot be used to decrypt the dataset. This data structure is designed such that attempts to decrypt the data will fail if the system clock shows a current date/time that is later than the lease key expiration date at the time that a decryption is attempted. The private key is kept secure in the data provider's backend infrastructure.

The private key associated with the created lease key is used to encrypt the requested dataset. The encrypted data and the public lease key are downloaded to the mobile device. At this point, the user can access the protected data on the mobile device until the lease key's expiration date/time is encountered. When the lease key expires, however, a routine attempt to access or decrypt the dataset will fail. This failure triggers a lease key renewal process that attempts to create a new lease key with a later expiration date/time.

In present systems, the renewal process requires a user interaction to manually re-authenticate to the backend server. This requires that the mobile device must be connected to a network. If the mobile device is not and cannot be connected to a network, the renewal process will fail and the user will be denied access to the data. If the mobile device is connected to a network, the user is prompted to connect to the data provider's backend infrastructure (i.e., backend server) and to manually re-enter his/her user credentials (i.e., domain name, user name, and password). If necessary or requested, this process can also download updates to the dataset. The result of a successful renewal is that all associated data (i.e., data already on the mobile device and any new updates provided to the mobile device) are encrypted with respect to the new lease key and new expiration date/time.

Therefore, while the current lease key system provides an effective system and method for protecting data that has been downloaded to the mobile device for the duration of the lease key's lifespan, when the lease key expires, it is necessary for the mobile device user to re-establish that he/she has permission to access the data on the device, and, perhaps, to update the data on the device. This current process of re-establishing access is cumbersome and somewhat intrusive to users since access to the data is blocked until the user completes this re-authentication process which, typically, requires a network connection to the backend infrastructure and an explicit user action (e.g., entering at least the user's password).

Satisfying the user in terms of ease-of-use or ease-of-access can be accomplished by minimizing the barrier to data access. However, previously proposed solutions to this problem either sacrifice security in the interests of increased user convenience, or sacrifice user convenience in the interests of increased security.

In present systems, creating or renewing the lease key utilizes a normal authentication process whereby the mobile device user knows his/her user credentials (i.e., domain, user name, and password) and enters them on a login form while connected to the backend infrastructure. This is a relatively weak authentication method since it only requires one authentication factor (i.e., the user credentials).

Moreover, by relying on the user to re-authenticate to the backend infrastructure utilizing only his/her credentials, present systems and methods for creating the lease key (for initial creation or renewal) do not fully meet the criteria for two-factor authentication. Two-factor authentication is an authentication process that utilizes at least two authentication factors, such as information that the user knows (e.g., user credentials); an object or thing that the user possesses (e.g., an accessory to the mobile device, such as a headset); or a unique and naturally occurring feature that the user possesses (e.g., a fingerprint, a retina).

Furthermore, in current systems, two-factor authentication is regarded as a simple extension of one-factor authentication. In one-factor authentication, anyone or anything that can provide one acceptable authentication factor is deemed to have satisfied the test for authentication. Easily compromised passwords (simply constructed or conspicuously written down) have led to the belief that it is often too easy for one authentication factor to become known. Therefore, in a two-factor authentication scheme, the user is asked to provide two authentication factors in which each authentication factor provides (implicitly in the way it is used) 50% of the evidence needed to satisfy the authentication test. Thus, the simple combination of 50% from each of the two factors results in 100% of the evidence needed to authenticate a user.

Mobile device users, in particular, present a more dynamic model of what constitutes authentication. Rather than requiring a user to provide exactly two authentication factors, users are working in a dynamic environment wherein he/she may be associated with one or more accessory devices that can themselves act as authentication factors. However, each of these accessory devices may have a varying degree of trustworthiness, which is how much the particular accessory can or should contribute to the system's overall confidence that the corresponding user should be authenticated (with the degree of trustworthiness based on factors including the accessory's presence in the system and the accessory's ability to pass a challenge/response test). The scenario is further complicated by the fact that, at any given moment, it could be that only one of several possible accessories is available in the environment for inclusion in authentication testing (e.g., some of the accessories may be turned off or be in a different physical location from the user).

Accordingly, there is a need for a system and method that utilizes an authentication and re-authentication process that fully implements two-factor authentication. There is a further need for a system and method whereby the authentication process is not only improved, but user interruption when the re-authentication process is triggered by the lease key expiration is also minimized. There is a further need for a dynamic authentication system and method that can be utilized with mobile devices and mobile device accessories.

SUMMARY OF THE INVENTION

Because current re-authentication processes utilize a single authentication factor, it is an object of the present invention to increase the convenience of lease key renewals by shifting the single authentication factor from something the user knows (e.g., user credential's such as a user name and password combination) to something the user possesses (e.g., another piece of hardware that the user typically carries along with the mobile device such as a headset).

In this embodiment, it is assumed that a user possessing both a specific mobile device and a specific accessory connected to the mobile device would be the authorized user, and thus the presence of both devices in a known configuration would successfully allow the user to re-authenticate.

Replacing the somewhat intrusive "what the user knows" re-authentication factor with a less intrusive "what the user possesses" re-authentication factor has several advantages over the existing art. For example, assuming a network connection is available or the lease key has been re-engineered to allow a 'soft' expiration, the user's access to the dataset on the device will not require an intrusive blocking operation (e.g., an operation that requires typing in a secured password). Another advantage of the present invention over the prior art is that the presence of an associated and connected mobile accessory (e.g., a headset or earpiece) would be determined only by the accessibility of a device with that matching Media Access Control ("MAC") address. Because most connectable mobile accessories have a unique MAC address, the need for an associated/connected accessory device to have a unique identifier is already met. Yet another advantage of the present invention over the prior art is its ease of implementation.

In another embodiment of the present invention, a mobile accessory such as a headset implements a new (or enhanced) protocol that is also supported by the primary mobile device (i.e., the device with the lease key/dataset) and the backend infrastructure that manages overall security (including lease keys) and data. In this embodiment, the re-authentication no longer presumes that the presence of a mobile device accessory with the known, pre-associated MAC address is sufficient to indicate that the primary mobile device is currently possessed by a person who possesses a known authentication factor. In this embodiment, the pre-associated MAC address is used as the target to which an authentication challenge is sent by the mobile device and from which a successful response is required. It is the response by the mobile device accessory to the challenge from the mobile device that determines whether the authentication is successful. In this embodiment of the present invention, the backend infrastructure manages the relationship between the primary mobile device and the mobile device accessory. The expiration of a lease key (created and given to the primary mobile device by the backend infrastructure) triggers the primary mobile device to search its environment for an associated mobile device accessory and challenge the associated mobile device accessory to respond appropriately. If the associated mobile device accessory is found and responds, further access to the protected dataset is allowed. This new response implements a more secure challenge and response protocol utilizing the mobile device accessory's MAC address as the destination to which the challenge is sent.

In another embodiment of the present invention, each challengeable mobile device accessory is provided with a private key that would be pre-installed on the device. The device could then create the public key that can be used to decrypt the information it provides (that was also encrypted with the public key). The mobile device accessory would then include an implementation of either a new challenge/response protocol, or an enhanced, existing protocol that would expose a way for external primary mobile devices to send a challenge and receive a response.

Regardless of whether this is a new protocol or an extension to an existing protocol, the protocol implementation on the mobile device accessory would have a mechanism to listen for a challenge that could include a seed that is used by the protocol to create a response message based on the incoming seed; create a response, whereby the receiving mobile device accessory would extract the seed or any other data from the challenge and compute the appropriate response message (e.g., the contents of the response message could include data such as the MAC address of the responding mobile device accessory, the result of applying the seed to some shared algorithm known to the challenge device and the response device, etc.); encrypt the response, whereby the receiving mobile device accessory would encrypt the response to the challenge using its private key and package the encrypted response into the expected response format; and send the response, whereby the receiving mobile device accessory would then send the encrypted response back to the device that issued the challenge using the transmission media expected by the device and/or protocol.

To include a private key in the mobile device accessory, the primary mobile device should be capable of sending the appropriate challenge to the appropriate device accessories in its presence. The backend infrastructure should also maintain an association between the user, his/her mobile device, his/her mobile accessory/accessories, and the dataset(s)/application(s) that the user is authorized to access. The association process should also be capable of obtaining and storing the "shared secret" or the public key that could be used by the primary mobile device or the server to decrypt the response from the mobile device accessory to any challenges sent by the primary mobile device or backend infrastructure.

Another embodiment of the present invention allows for self-service management of a user's devices and accessories.

In yet another embodiment of the present invention, an environmental signature is created whereby each of the currently associated mobile device accessories contribute to the environmental signature. The environmental signature is an identification and recognition of various aspects of the current state of the user's associated accessories and can also include information about various aspects of the current state of the primary mobile device. This environmental signature can be analyzed to determine whether it contributes sufficient evidence to determine whether a given user can be authenticated.

For example, utilizing this particular embodiment, authentication would succeed if the primary mobile device's radio was turned on and one challengeable accessory returned a successful response to the challenge. In instances where the device was known to be lost or stolen, requiring the device's radio to be turned on could also allow the device to be found and a wipe device signal to be received.

In this particular embodiment, the authentication mechanism introduces a convenience/security continuum against which authentication attempts can be made. At any time, an application requesting authentication can provide some set of authentication factors and get a response that indicates whether authentication (based on those authentication factors) is allowed, denied, or needs additional information. An attempt that attempts to authenticate with a higher level of user convenience will send a set of authentication factors (i.e., an environmental signature) that can be collected from the user's environment without interrupting the user.

Unlike current authentication schemes, wherein the only other choice to a successful request is a failed authentication, the present invention incorporates a neutral state which indicates that the authentication request needs additional information or evidence before determining whether to allow or deny an authentication. This third, neutral state response may include an indication of a specific authentication factor that is required (e.g., for high security scenarios that always require one or more specific authentication factors). The calling application that receives a neutral response then has the option of gathering additional authentication factors that may be less convenient/more intrusive, and send a new request. This particular embodiment improves the ability to balance security and convenience when deploying applications and/or accessing data that have been placed on a primary mobile device without degrading the level of security that may be assigned to a given application/dataset since the backend infrastructure retains control over what constitutes adequate authentication measure(s). Improved convenience is provided with the provision of a mechanism by which an application or data access method can request authentication with a varying set of authentication measures. By introducing a controlled but iterative approach to authentication, the application retains some control over when and/or where to introduce possible user interaction/interruption and can leverage this to provide an improved user experience.

The present invention offers several advantages over existing systems. The user convenience of treating an existing primary mobile device as a kind of "security dongle" is retained. The user is not interrupted (and no typing of strong passwords is required) while the system performs its normal tasks of authenticating and re-authenticating the access to the application/dataset. The user is only inconvenienced in non-standard situations where security practice indicates that the need for security clearly overrides the desire for user convenience. The association between the user, the primary mobile device, and the mobile device accessory/accessories is cryptographically secure once the initial association is performed (presumably in a secure, controlled environment). The creation of the association and the establishment of a primary key and shared secret in this secure environment allow the use of public key infrastructure techniques once the person and devices leave the more secure corporate environment. Using an existing platform such as Bluetooth for a "something the user possesses" security factor allows this scenario to be built with minimal extensions to the user's existing hardware/software platform. The primary addition to the existing environment is the development and deployment of the new protocol (or the extension of an existing protocol/profile) for the challenge/response presence. The mechanism for gathering evidence from multiple associated accessories also moves closer to having a true, multi-factor authentication process.

DETAILED DESCRIPTION OF THE PREFERRED EMBODIMENTS

Figure 1:
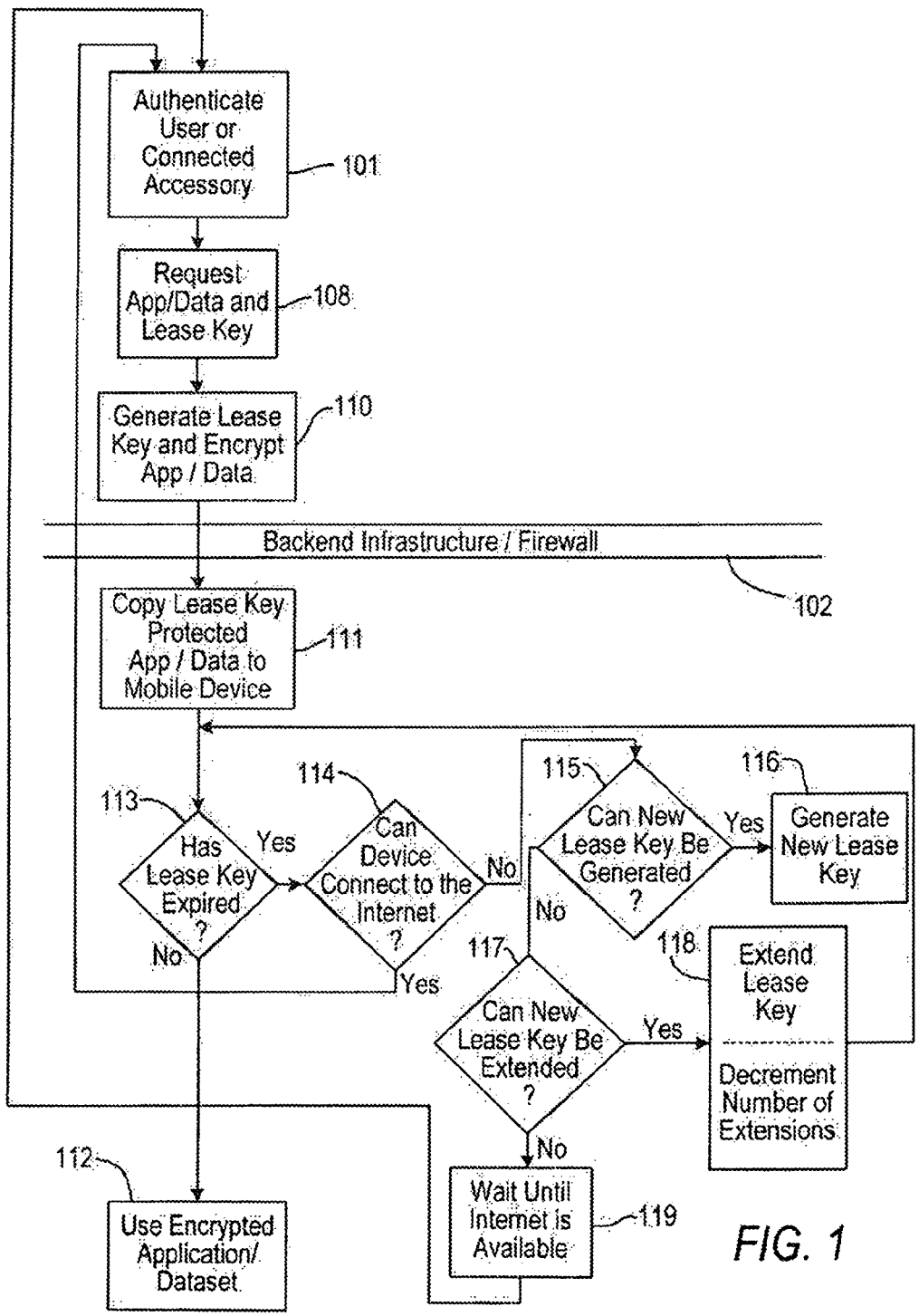
FIG. 1 is a diagram depicting an overview of system and method of the present invention.

As shown in FIG. 1, In step 101a primary mobile device performs an initial authentication based on information corresponding to one or more users, mobile devices, or mobile device accessories stored at a backend infrastructure having a firewall. For example, the backend infrastructure can be extended to associate the MAC address of a primary mobile device and a mobile device accessory with a particular user. In step 108, the primary mobile device can request one or more application(s)/dataset(s) (also stored on the backend infrastructure) with a corresponding lease key for the provided user/device/accessory combination. Once an association between the user, primary mobile device, mobile device accessory, and requested application(s)/dataset(s) is established, then in step 110, the backend infrastructure generates a lease key with an expiration date/time and downloads and encrypts one or more application(s)/dataset(s) associated with the lease key. In step 111, the lease key protected application(s)/datset(s) can then be copied to the primary mobile device. In step 112, user can then access the application(s)/dataset(s) on the primary mobile device without restriction until the lease key protecting the dataset expires. That is, in step 113, when the primary mobile device determines that the lease key has expired, the lease key can no longer decrypt the application(s)/dataset(s) on the primary mobile device and, in step 114 a re-authentication/lease key renewal process is started on the primary mobile device by first attempting to establish a connection to the internet.

If the primary mobile device can connect to the internet, the primary mobile device gathers a list of local area MAC addresses to which it is connected. This list of connected accessories is then incorporated in the renewal request by connecting the primary mobile device to the backend infrastructure and requesting an updated lease key for the provided user/device/accessory list combination. The request may include information about the user and primary mobile device making the request along with information about accessories to which the device is connected. The backend infrastructure receives the request and, without direct user interaction, responds. The response will depend on information the backend infrastructure has about the user, device, and/or mobile device accessory.

If the backend infrastructure recognizes a match for the user and his/her primary mobile device and mobile device accessories, a new lease key is generated and returned to the primary mobile device. The returned lease key message may also include an indicator of whether there is a new version of the application or new and/or updated data for the dataset protected by the lease key. The user may also be asked whether he/she wants to receive the update immediately or at a later time. This allows the user to quickly access the application or data while the automatic re-authentication processing occurs without requiring any user typing or other interaction.

If the backend infrastructure does not recognize a match for the user and his/her primary mobile device and mobile device accessories, the user can enter a more intrusive re-authentication process. The user can be prompted to press a login button to re-scan the primary mobile device's connected accessories and send another updated renewal request. This would allow a user to more easily re-authenticate without typing or initiating a similar interaction when he/she has the associated mobile device accessory, and will also allow execution of the more intrusive re-authentication scheme when that mobile device accessory is not available.

When the primary mobile device receives the response, the primary mobile device's lease key will also process the response to the request. When a new lease key for the existing dataset is received, the new lease key will be installed on the primary mobile device and access to the application or dataset will proceed without the user having been aware that a new lease key was generated on his/her behalf. Preferably, when a new lease key for an updated dataset is downloaded and installed on the primary mobile device and/or the application launch, the launch action will include a note to the user that he/she is seeing an updated dataset. When a new lease key has not been generated, the response will indicate whether the failure to produce a new lease key should trigger some known side effect, such as informing the user; forcing a wipe dataset action; initiating the current lease key renewal process; or triggering an access failure when the user next attempts an access.

Without a connection to the internet, the system may disallow any re-authentication because no authentication factor can be verified against the backend infrastructure. Thus, the user will not be allowed to access the dataset on the primary mobile device until a connection to the internet (and a connection to the backend infrastructure) is re-established.

If the primary mobile device cannot connect to the internet, the present invention moves to step 115 where the software controlling the local environment on the primary mobile device may be embedded with the capability to issue a renewed, temporary lease key that will provide access to the dataset. Preferably, the original lease key is embedded with a MAC address(es) of the mobile device accessory/accessories that will permit generation of a renewed lease key. If the software on the primary mobile device is capable of generating a lease key without re-connecting to the backend infrastructure, the re-authentication process will detect the presence of one or more additional connected accessories and, in step 116, generate a new, temporary lease key for the dataset.

In step 117, if the primary mobile device cannot be embedded with lease key generation software, then in step 118, the original lease key will be extended with the addition of a soft expiration term and a hard expiration date/time. When the soft expiration term commences, access to the dataset will only be allowed in the presence of one or more mobile device accessories whose MAC addresses are embedded and encrypted in the lease key. Alternatively, during the soft expiration term the user will be granted access up to a specific number of times. In step 119, when the hard expiration date/time is reached, access will be denied until a connection to the backend infrastructure can be made and true re-authentication can occur.

Figure 2:
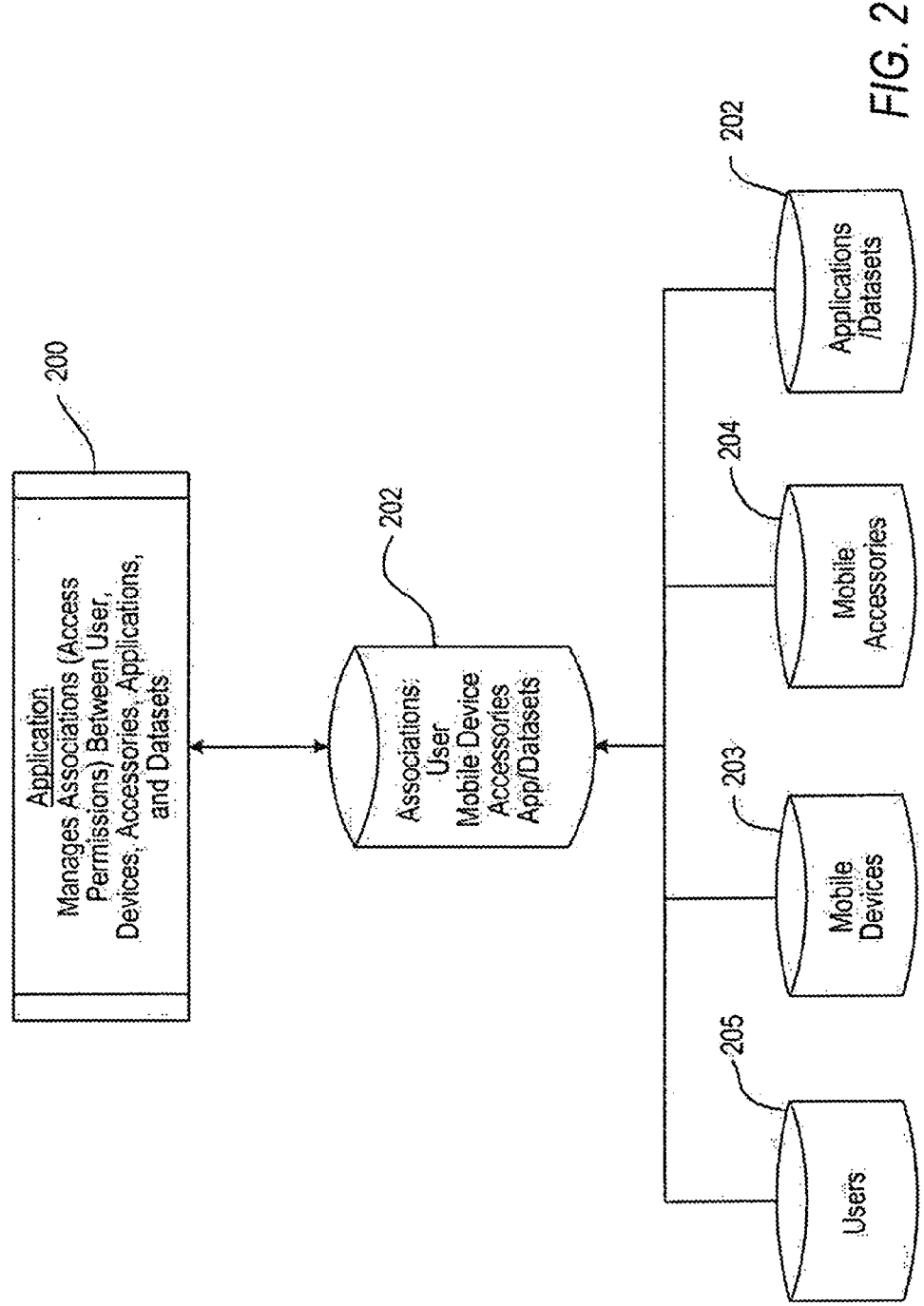
FIG. 2 is a diagram depicting infrastructure preparation.

As shown in FIG. 2, a backend infrastructure is prepared by utilizing an application 200 that assigns a relationship between a user and that user's assigned primary mobile device and mobile device accessories 201. This establishes the permissions necessary for a specific user to download specific applications and datasets 202 to a specific primary mobile device 203. It also establishes which mobile device accessories 204 are associated with the user 205. Preferably, the infrastructure should include data capable of verifying specific applications/dataset that the user is permitted to access; data capable of verifying the primary mobile device (s) on which the user can download the applications/dataset; data capable verifying authentication factors sent to user's the primary mobile device(s); and data capable of generating lease keys that can enforce these verifications and relationships.

Once the associations between the user, the user's primary mobile devices, the user's mobile device accessories, and the applications/datasets are established, the user's access to the backend infrastructure allows him/her to securely download and use the data to which he/she has been granted access. The user is authenticated to a backend infrastructure and runs an application that allows the user to select for download one or more applications and/or datasets for which access has been granted. When the user has made his/her selections, the infrastructure gathers data about the expected mobile environment in which the application(s)/dataset(s) will be allowed and generates the necessary lease key(s) that will be used by these application(s)/dataset(s).

Each lease key is generated so that it (or data encapsulated in it) can be used as a public key to decrypt the application(s) and/or dataset(s) that are encrypted by the associated private key in the backend infrastructure. The lease key may include a soft expiration term during which initial attempts can be made to renew the lease key; a hard expiration date/time after which any attempts to access the application/dataset after this date/time will fail and access will only be allowed after a new lease key that allows the decryption is present; an encrypted representation of a unique identifier of the primary mobile device on which the lease key can be used; and an encrypted set of unique identifiers of other mobile devices accessories that can serve as local authentication factors, so that a challenge can be sent to these devices in order to determine whether the primary mobile device is also connected to or in the proximity of another mobile device accessory that is known to be associated with this user.

When the appropriate lease key is generated, the infrastructure encrypts the requested application(s) and/or dataset(s) with the associated private key. Then, the lease key and the application(s)/dataset(s) are downloaded to the primary mobile device over the established internet connection. This connection may be between a PC and the internet where the primary mobile device is tethered to the PC in a docking station. Alternatively, the connection may also be made over the air directly by the primary mobile device to the internet.

Figure 3:
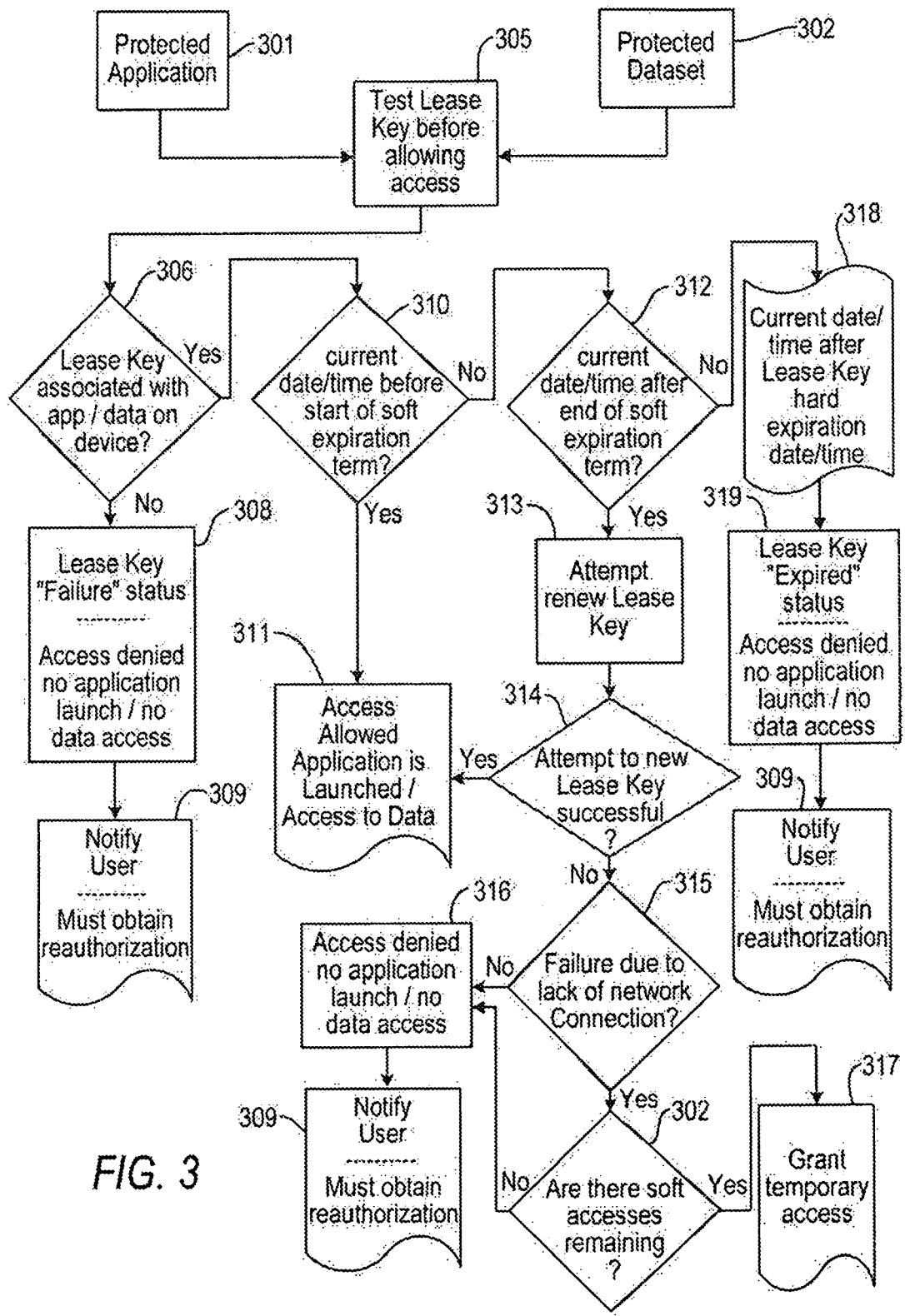
FIG. 3 is a diagram depicting launching of encrypted applications and/or accessing of encrypted datasets on a primary mobile device.

As shown in FIG. 3, in step 301 the user may attempt to launch an encrypted application and/or in step 302, attempt to load an encrypted dataset into an application. Because the application or dataset is encrypted, in step 303, the application launching code or the open dataset code in the application should be capable of implementing a routine that knows how to use the lease key on the primary mobile device to access the application/dataset. With respect to an encrypted application, invoking the application runs an unprotected routine (similar to the wrapper program of a password-protected, self-expanding compression archive application) to determine whether the real application payload can be decrypted and run in memory. With respect to an application that is attempting to open an encrypted dataset (regardless of whether or not the application itself was protected with a wrapper program) the application accesses the data through a routine that determines whether the dataset can be decrypted. Regardless of which steps were performed, the routine receives information about the application/dataset for which access is being requested and, in step 305, that information is compared to the information in the lease key (that is already on the primary mobile device) associated with the application/dataset.

In step 306, the primary mobile device searches for a lease key associated with an application/dataset. An attempt to decrypt the requested application and/or dataset fails because a lease key for that application/dataset was not found or because a lease key on the device does not contain a public key that can decrypt the requested application/dataset. In either case, in step 308, access is denied and a "lease key failure" status is preferably returned to the application launcher or dataset reader that called the decryption attempt routine. This "lease key failure" status either does not allow an application to launch, or denies access to the dataset unless and until a proper lease key is placed on the primary mobile device. An application or data reader that receives a "lease key failure" return status will interpret the failure to indicate that the application or data reader needs to initiate a communication with the backend infrastructure to obtain a valid lease key for the requested user/device/application/dataset combination. Thereafter, in step 309, the user is either notified that access has been denied, or an attempt can be made to acquire the lease key by communicating with the backend infrastructure. To prevent network overloading, it is expected that the calling application or data reader would implement some kind of throttling mechanism such that attempts would be made only a fixed number of times (in which case, a more permanent error such as an explicit data lockout would occur) or attempts would only be made at a pre-defined interval.

In step 310, a lease key on the device is used to decrypt the requested application and/or dataset when the time of the request is prior to the start of a soft expiration term that is represented in the lease key. In step 311, access to the lease key is allowed and an "access allowed" status is preferably sent to the application launcher or dataset reader that called the decryption routine. With respect to an application launcher, the calling routine interprets this return status as permission to decrypt and launch the application in memory. With respect to a dataset reader, the calling routine interprets this return status as permission to decrypt the dataset in memory and allow subsequent calls to access the dataset to return the appropriate data.

In step 312, a lease key on the primary mobile device is used to decrypt the requested application/dataset when the time of the request is after the start of the soft expiration term, but before the hard expiration date/time in the lease key. In step 313, an attempt to renew the lease key is made by connecting to the backend infrastructure.

If, in step 314, the renewal succeeds, a lease key is renewed, and in step 311, access is allowed, the application launcher or dataset reader is notified that the requested application can be decrypted and launched or that the requested dataset can be decrypted and made accessible (potentially using the new lease key that was obtained as part of the renewal process).

If, in step 315, the renewal fails, the renewal may have failed because there is no network connection or because the backend infrastructure failed to return a result within a pre-specified time. If, in step 320, failure was due to a lack of network connection, access is requested for as many times as the soft expiration period allows, after which access is denied in step 316. In step 316, if failure was not due to a lack of network connection, the user is no longer authorized to access the requested application/dataset, and a failure code is returned to the application launcher or dataset reader indicating that access to the dataset is denied. Thereafter, in step 309, the user is either notified that access has been denied, or an attempt can be made to acquire the lease key by communicating with the backend infrastructure.

If a temporary renewal is allowed as in step 317, it is allowed for the duration of the launched application's lifetime or the data reader's lifetime, but not to exceed access past the hard expiration date/time. If this temporary renewal succeeds, the application launcher or dataset reader is notified that the requested application can be decrypted and launched or that the requested dataset can be decrypted and made accessible. If this temporary renewal fails, then the user may be notified that the temporary renewal failed thus prompting the user to take corrective action in the local environment (e.g., turning on a device that the user knows is specified as a local authentication factor), so that the next attempt will succeed. Preferably, the system should inform the user of the failure and attempt the temporary renewal again after some pre-defined waiting period, and for a pre-defined number of attempts. At some point, either after the first failure or after some number of failures or time duration without success, the failure of the temporary renewal should return a failure status to the calling application or data reader to indicate that access is denied.

In step 318, an attempt is made to decrypt an application/dataset with a lease key that is appropriate for the application/dataset, but where the hard expiration date/time enforced by the lease key has expired. In step 319, access is denied and a "lease key expired" status is preferably returned to the calling application or data reader. As a result of this "lease key expired" status, the application is either not allowed to launch, or access to the dataset is denied unless and until a valid lease key is placed on the device. An application or data reader that receives a "lease key expired" return status may interpret that failure to indicate that the application or data reader needs to initiate a communication with the backend infrastructure to obtain a valid lease key for the requested user/device/application/dataset combination. Thereafter, in step 309, the user is either notified that access has been denied, or an attempt can be made to acquire the lease key by communicating with the backend infrastructure. To prevent network overloading, the calling application or data reader may also implement a throttling mechanism whereby a fixed number attempts could be made (in which case, a more 'permanent' error such as an explicit data lockout would occur). The attempts could also be made at a pre-defined interval.

Figure 4:
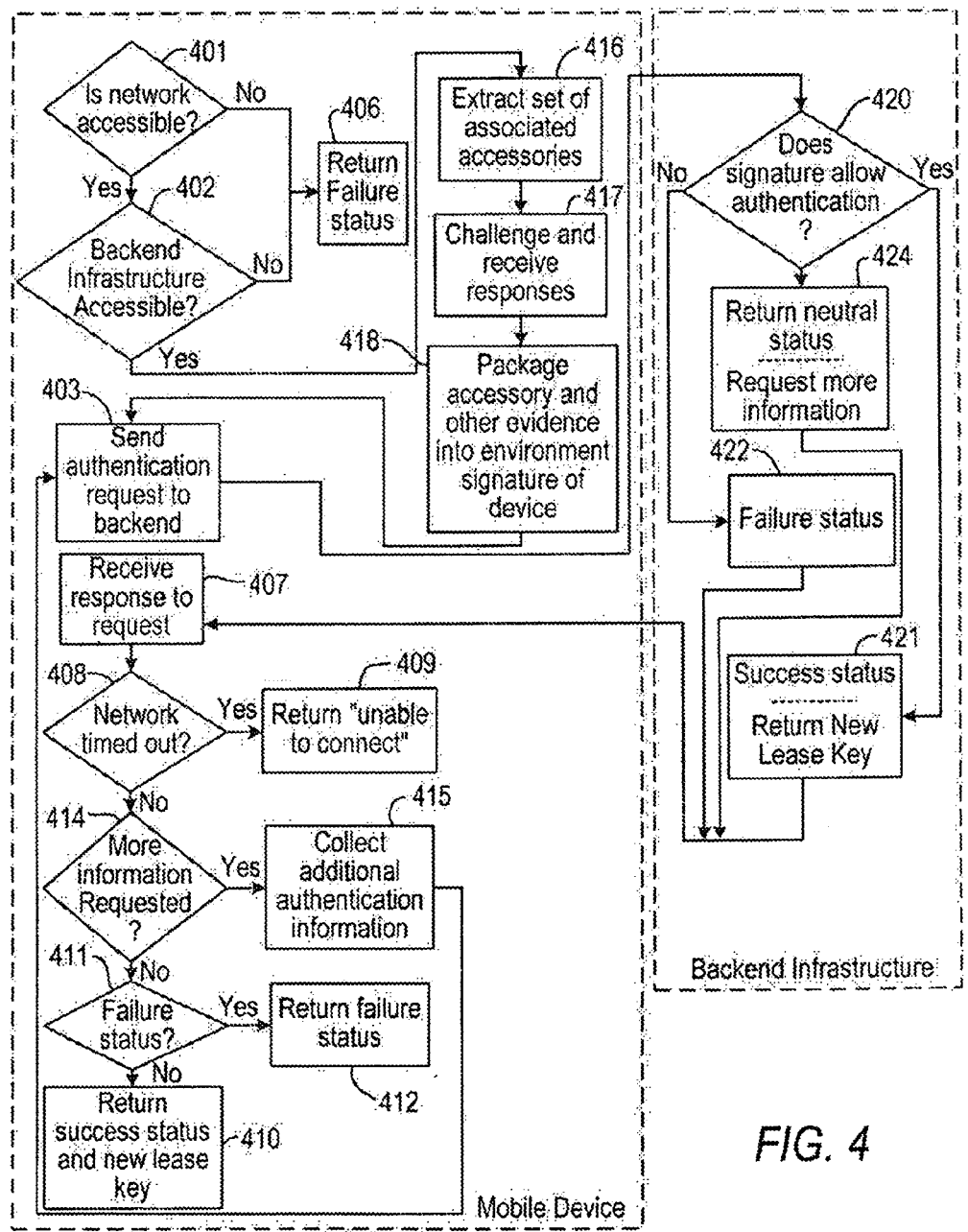
FIG. 4 is a diagram depicting attempted renewal of the lease key via a backend infrastructure.

As depicted in FIG. 4, in another embodiment of the present invention, a renewed lease key is obtained from the backend infrastructure when no existing lease key is found on the primary mobile device; when a lease key that has been found cannot be used to decrypt the requested application/dataset; or when the hard expiration date/time has lapsed. If, in step 401, a network connection is established and from step 402, the backend infrastructure is accessible, then in step 403 (after going through steps 416, 417, and 418 as discussed below) a request to the backend infrastructure is sent for a lease key, having a new soft expiration term, a new hard expiration date/time, and corresponding to a specific application/dataset.

The primary mobile device cannot connect to the network from step 401, or in step 402, the backend infrastructure is not accessible, then, in step 406, a failure status is returned to the calling application/data reader with an indication that the network or backend infrastructure is inaccessible.

If the primary mobile device can connect to the network and the backend infrastructure, and can present authentication credentials to the backend infrastructure, in step 403, a request is sent to the backend infrastructure requesting a new lease key for the combination of the current user/mobile device/mobile device accessory/application/dataset. The request may contain a reference to the lease key (or the lease key itself) for which a renewal is being requested and an indication of why the request is being made. Reasons for the request may include no lease key on the primary mobile device; the given lease key cannot decrypt the application/dataset (possibly a lease key/application/dataset mismatch); or the hard expiration date/time has lapsed. When the backend infrastructure receives the information in this request, it can then use this information to determine the appropriate response to the request. In step 407 the mobile device receives the response from the backend infrastructure.

Possible responses to the request will include a network timeout as in step 408 or dropped connection to the request, which will be interpreted as a failure similar to the "unable to connect" failure as shown in step 409. Alternatively, in step 410 a success response will include a new lease key for the user/mobile device/mobile device accessory/application/dataset combination. This success response will indicate that the provided lease key can be used by the user/device for the current version of the application/dataset that is on the device. The successful return of this lease key will then allow the calling application or data reader to replace the existing lease key with the newly provided lease key and to proceed using the new lease key to decrypt the requested application/dataset. The success response will also indicate that the provided lease key can be used by the user/device to decrypt a new version of the application/dataset. This successful response will include sufficient information for the calling application to spawn a routine that will initiate the download of the new application/dataset and trigger the application to re-launch after the download is complete, or alternatively, trigger a data reader to try again on the new dataset once it has been downloaded.

In step 411, if a failure status is detected, the present invention moves to step 412 where it returns status information that the calling application/dataset could use to determine whether it was an intermittent failure (and another attempt should be tried again later) or whether the failure is intended to indicate that access permission for the specified user/mobile device/mobile device accessory/application/dataset combination has been explicitly revoked (which could be used to trigger a targeted application/dataset wipe of the device).

In addition to success and failure responses, in step 414, a neutral status response will indicate that the backend system did not allow an authentication because of the insufficiency of the environment signature that was included in the request. In step 415, neutral response will include an indicator asking the requestor to provide additional information and status codes that will indicate specific authentication factors that should be obtained and included in a subsequent request. This neutral response does not deny the request, but merely asks for more information before authentication is allowed.

Returning to steps 401 and 402, if there is a network connection and access to the backend infrastructure, an authentication attempt is made by sending an authentication request to the backend infrastructure that includes information about the primary mobile device and the current environment signature. In particular in step 416, a list of mobile device accessories associated with the current lease key from the current lease key is extracted. A challenge/response protocol is then implemented in step 417 whereby the primary mobile device challenges the mobile device accessories to respond. For each mobile device accessory in the list, if the mobile device accessory does not implement the challenge/response protocol, the mobile device determines whether the mobile device accessory is present in the environment, and if so, sends a challenge to the mobile device accessory and records the response.

Additional state information or "evidence" about the primary mobile device (e.g., whether the device's radio is on) and/or the environment (e.g., radio signal strength) is also gathered. In step 418, a data structure or "environment signature" is created representing the set of mobile device accessories extracted from the lease key, their status in the environment (e.g., "not present," "present," "present—not challengeable," "present—challenged," and "response included"), and the additional state information about the mobile device. The environment signature is encrypted with the primary mobile device's private key and the encrypted information is added to the authentication request. Once this information is gathered, the authentication request is sent to the backend infrastructure as explained above in step 403. In step 420, the backend infrastructure will then determine whether the request permits authentication. If authentication is permissible, the backend infrastructure will deliver a successful status to the primary mobile device in step 421. If authentication is not permissible, the backend infrastructure, in step 422, will deliver a failure status to the primary mobile device. Alternatively, if the information contained in the request is insufficient, the backend infrastructure, in step 424, can deliver a neutral status and request additional authentication information.

Upon receipt of the authentication request, the backend infrastructure will extract the data from the incoming request, including the requesting primary mobile device's unique ID. The request uses the requesting primary mobile device's unique ID to look up its public key and uses this public key to decrypt the environment signature that was included in the request. The backend infrastructure invokes a subsystem that analyzes the environment signature with respect to the user/mobile device/mobile device accessory/application/dataset associations that are known to the backend infrastructure and makes a determination about whether the environment signature has presented sufficient evidence to allow an authentication to be made. This system is implemented such that each possible authentication factor (including primary mobile device state, manual login credentials, biometric scan data, mobile device accessory presence and responses to challenges, etc.) are defined as required or optional and are weighed as varying degrees of "evidence" to the authentication request.

Some factors contribute positive evidence to varying degrees. For example, the presence of a "dumb" headset may indicate weak evidence; a "smart" device's successful response to a challenge may indicate moderate evidence; and properly entered user name/password/domain or proper retinal scan data may indicate strong evidence. Some factors contribute negative evidence to varying degrees. For example, the presence of a "dumb" device that was removed from the user's accessory profile because it was thought to be lost may indicate weak evidence; presence of a "smart" device for which no response to the challenge was received may indicate moderate evidence; and an incorrect response to a challenge sent to a "smart" device or an incorrect user name/password/domain may indicate strong evidence.

Figure 5:
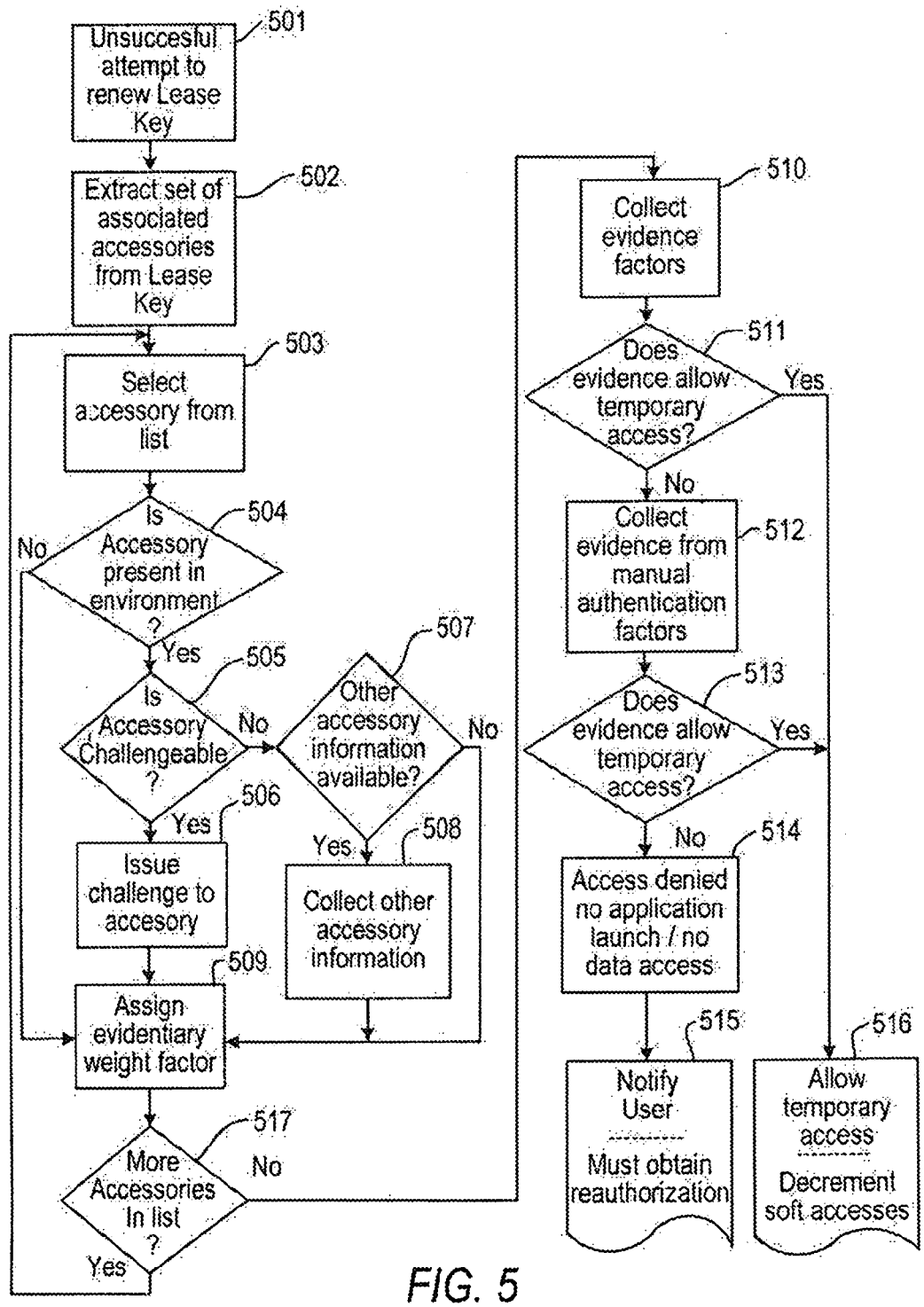
FIG. 5 is a diagram depicting an attempt to extend the lease key in a local environment.

As shown in FIG. 5, in an alternative embodiment of the present invention, in step 501 the current lease key is used to decrypt the requested application/dataset when an attempt to renew the lease key from the backend infrastructure has been unsuccessful due to the primary mobile device's inability to make a network connection to the backend infrastructure.

In step 502 of this embodiment, the set of mobile device accessories associated with the given user is extracted from the lease key. In step 503, each mobile device accessory in the set can be selected to evidence, in step 504 that the mobile device accessory is present in the environment and that the user associated with the devices is in possession of the devices. For each mobile device accessory in the set, in step

505, the lease key determines if the device is challengeable by providing, for example, a device type (e.g., Bluetooth, USB, SD card, manual, etc.) and, when appropriate, an IP address or access path that can be used to attempt a network connection to the device. Using this information, in step 506, the primary mobile device issues a challenge to each of the mobile device accessories in the accessory device set. If the mobile device accessory is not challengeable, in step 507, the primary mobile device seeks additional information regarding the mobile device accessory and, in step 508, collects any available additional information 508. In step 517, the process is repeated for each mobile device accessory in the set. In another embodiment, the challenge/response protocol specifies the number, ratio, or percentage of successful challenges that must be met in order to consider the evidence to be sufficient. The challenge/response protocol may also determine whether the failure of a single factor should cause the entire authentication to fail; whether that factor should enter a "try again" phase; or whether that factor can be overruled in the presence of other evidence.

In step 509 the primary mobile device then assigns evidentiary weight to the factors in the responses from each mobile device accessory in the set. Collecting and weighing these factors in step 510, the primary mobile device, in step 511, determines whether there are sufficient evidentiary factors in the primary mobile device's environment to permit a successful temporary extension of access during the grace period between the start of the soft expiration term and the hard expiration date/time. If there are sufficient evidentiary factors, a success status (and, optionally, some indication of the evidence ranking that was determined) is returned indicating to the calling program that temporary access to the application/dataset is currently allowed in step 516. If, in step 511, the primary mobile device determines that there are not sufficient evidentiary factors in the primary mobile device's presence to permit access to the application/dataset during the grace period, then the present invention moves to step 512 where the primary mobile device can collect manual authentication factors. If, in step 513, the primary mobile device still determines that there are not sufficient evidentiary factors in the primary mobile device's presence to permit access to the application/dataset during the grace period, then, in step 514, access is denied and a failure status is returned. Alternatively, some indication of how the evidence weighed prior to the failure can also be returned. Returning this failure status indicates to the calling program that access to the application/dataset is not allowed. Thereafter, in step 515, the user is either notified that access has been denied, or an attempt can be made to acquire the lease key by communicating with the backend infrastructure.

If the authentication factor is a Bluetooth Device, the primary mobile device can attempt to connect to the Bluetooth device. If the Bluetooth device is not available, the device may be turned off or out of range, and consequently return zero evidence to indicate that this authentication factor neither strengthens nor weakens the evidence set. If the Bluetooth device is a standard Bluetooth (i.e., does not implement the previously discussed protocol extension) and is also accessible, then weak, present evidence could be returned. Present evidence indicates that there is evidence that this authentication factor is present but that the evidence is not conclusive. Alternatively, present evidence can also be interpreted as strong negative evidence if the accessory is defined as being expected to have an implementation of the enhanced protocol. If the Bluetooth device implements the enhanced protocol/profile that would protect the MAC address and expected return value, and the device is accessible, then the device is challenged with a unique challenge message derived from the lease key. If the response to the challenge is the expected response, then there is strong, positive evidence that the authentication factor is present. If the response to the challenge is not the expected response, then there is strong, negative evidence that the authentication factor is there.

If the authentication factor is a USB device or SD card that can be connected to the device, the primary mobile device can try to access the device/card. If the device is found and the lease key information about the device indicates that the device is capable of implementing an authentication client, the authentication client could be called to get the credentials stored on the device/card. This would be similar to the process used when certain kinds of SanDisk cards are inserted into a PC's USB slot. If the device is found and the lease key information about the device indicates that it is a "plain" USB device or SD card, then the lease key information about the device could indicate details about the device that could be determined by system calls (e.g., manufacturer, capacity, unique ID, etc.). Alternatively, the lease key information could specify that a specific file name having specific size/type/contents should be present on the device. The presence of the specified information could be used to provide some weak evidence that an expected authentication factor is present. In either case, absence of the device could indicate inconclusive evidence and failure of a device to provide the expected response from an authentication client. Lack of an expected device type, file size/type/content, etc., could also indicate negative evidence for that particular authentication factor.

If the authentication factor is a manual authentication factor, the primary mobile device can prompt the user with a challenge and expect the user to enter the response to that challenge. To increase the level of user convenience, the implementation may also choose to probe the authentication factors that are not manual (i.e., do not require user interaction) prior to asking the user for any of these manual authentication factors. This provides sufficient evidence to allow the user a lease key extension without requiring any user interaction or interruption. The lease key information about this manual authentication factor would include a challenge prompt and presumably an expected response (or specifying an action that should be taken on the response).

Alternatively, an encrypted, simple passphrase could be stored in the lease key and the user could type in the passphrase. The user's typed passphrase could be compared to the passphrase encrypted in the lease key to determine if they matched. This could provide positive evidence of the user's presence that is strong enough to allow the lease key to be extended until the final, hard expiration date/time lapsed even if it would be considered too weak to be used to authorize the creation of a new lease key on the backend infrastructure.

In yet another embodiment of the present invention, an authenticated user (either a known system administrator or the user him/herself) manages the set of devices/accessories associated with a specific user. In this embodiment, prior to being allowed access to the data management aspects of the application, the user obtains permission to access/manage the mobile devices/mobile device accessories association data. Based on the possible loss of control over where access to the protected applications/datasets will be allowed, it is necessary to directly authenticate (with manual or biometric authentication measures) to the backend infrastructure. A "normal," as opposed to an "administrative," user will only be allowed to manage the mobile devices/mobile device accessories assigned to him/her. An administrative user will be allowed to manage the devices/accessories assigned to other users though the set of users a particular administrative user can manage will be tightly controlled and administered via a separate application inside a firewall. Once an administrative user has logged in, he/she will be asked to provide the username/domain that he/she wants to edit and the application will verify that the administrator has permission to edit that user's information.

When a new primary mobile device (such as a smartphone/PDA on which protected application(s)/dataset(s) will be downloaded and on which access will be provided) is added, the primary mobile device information is provided and this information is stored along with the ID of the user who is associated with the primary mobile device. When information about a primary mobile device is edited, the necessary changes are made by the user and, upon confirmation, the information in the underlying database is updated accordingly. When information about a primary device is deleted, the user confirms the deletion of the device and the corresponding information in the underlying database is removed (or marked as inactive).

When the mobile device accessory is used as a possible authentication factor and does not support the challenge/response protocol described earlier, the accessory device is described in terms of its manufacturer (e.g., Motorola), its purpose (e.g., Bluetooth earpiece), and/or its unique MAC address. When the mobile device accessory supports the challenge/response protocol, the aforementioned information is captured along with the public key that is associated with the primary mobile device. This public key is used by any primary mobile device that issues the challenge to this accessory since this public key must be used to decrypt the response to the challenge. When a new accessory is added, all of the aforementioned information about the accessory should be provided and stored along with the ID of the user who is associated with the accessory. When the aforementioned information for an accessory is edited, the necessary changes are made by the user, and, upon confirmation, the information in the underlying database is updated accordingly. When an accessory is deleted, the user should confirm the deletion of the accessory and the corresponding information in the underlying database is removed (or marked as inactive).

As each individual addition/modification/deletion of a user device or accessory is made, the underlying database is changed accordingly. These changes can affect the lease keys that are generated for the user in the future if the lease key as includes information about the accessories that can be used as authentication measures and the information necessary to decode a response that may be received after a challenge is sent. When the management task is performed on a device other than the user's primary mobile device, the impact of these changes will be made the next time the primary mobile device connects to the backend infrastructure and requests a new or renewed lease key. Alternatively, when the management task is performed on the user's primary mobile device, it is preferred that the management application detect this condition and—when the user has finished making the changes—request the backend to generate new lease keys for the user's existing application(s)/dataset(s) that take the changes into account. This allows the user's primary mobile device to immediately get new lease keys for the allowed application(s)/dataset(s) that would allow any new accessories to be factored into and/or removed accessories to be removed from consideration in future lease key renewal authentication tests that are made.

Detecting and processing these changes and altering the current lease keys on the device provides several advantages including, the application can take advantage of the existing connection to the backend infrastructure to generate new lease keys (with, perhaps, new expiration dates) that could postpone the need for a renewal or more quickly detect the case where access has been denied since the last lease key generation; the user removes the ability for existing lease keys to leverage an accessory that has been lost and for which the user does not want the accessory to serve as an authentication factor; and the user is provided the added convenience of adding a new authentication factor that takes effect immediately (especially if the presence of the new authentication factor increases the likelihood that a temporary lease key extension may be granted in the future).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A system for securing data on a mobile device comprising:
   At least one backend infrastructure having machine readable storage medium having stored thereon a plurality of code sections executable by a machine, said code sections comprising a plurality of applications and datasets;
   at least one primary mobile device comprising a machine readable storage having stored thereon a plurality of code sections executable by a machine for communicating with said backend infrastructure, receiving data transferred from said backend infrastructure, storing data, and transferring data to said backend infrastructure; said machine readable storage medium of the at least one primary mobile further having data stored thereon, said code sections and said data being encrypted;
   at least one mobile device accessory, comprising a machine readable storage medium having stored thereon a plurality of code sections executable by a machine for communicating with said primary mobile device, receiving data transferred from said primary mobile device, storing data, and transferring data to said primary mobile device;
   connection means for connecting said primary mobile device to said backend infrastructure whereby said backend infrastructure may transfer a lease key to said primary mobile device, said lease key comprising a dataset capable of decrypting data and code sections stored on said primary mobile device for a limited period of time; and
   authentication means for obtaining said lease key whereby, expiration of the lease key triggers the primary mobile device to search its environment for a mobile device accessory and challenge said mobile device accessory to respond appropriately and if the associated mobile device accessory is found and responds appropriately in accordance with a protocol that is supported by the primary mobile device and the backend infrastructure, the lease key is provided to the mobile device enabling said primary mobile device to decrypt encrypted data stored thereon.

2. The system of claim 1 whereby said connection means comprises establishing an internet connection between said primary mobile device and said backend infrastructure.

3. The system of claim 2 further comprising a means of generating a temporary renewed lease key when said internet connection cannot be established.

4. The system of claim 2 further comprising a means of temporarily extending the expiration of said original lease key when said internet connection cannot be established.

5. The system of claim 1 whereby said authentication means further comprises a challenge by said primary mobile device to said mobile device accessory to respond to said primary mobile device where said challenge includes a seed; a response to said challenge by said mobile device accessory to said primary mobile device based on the seed applied to an algorithm shared by the primary mobile device and the mobile device accessory; and sending said response through said connection means to said backend infrastructure.

6. The system of claim 5 whereby said authentication means further comprises developing an environment signature and sending said environmental signature to said backend infrastructure with said request for said lease key.

7. A method for securing data on a mobile device utilizing at least one backend infrastructure having machine readable storage media having stored thereon a plurality of code sections executable by a machine, said code sections comprising a plurality of applications and datasets; at least one primary mobile device comprising a machine readable storage medium having stored thereon a plurality of code sections executable by a machine for communicating with said backend infrastructure, receiving data transferred from said backend infrastructure, storing data, and transferring data to said backend infrastructure; said machine readable storage medium of the backend infrastructure further having data stored thereon, said code sections and said data being encrypted; at least one mobile device accessory, comprising a machine readable storage medium having stored thereon a plurality of code sections executable by a machine for communicating with said primary mobile device, receiving data transferred from said primary mobile device, storing data, and transferring data to said primary mobile device; said method comprising the steps of:
 connecting said primary mobile device to said backend infrastructure whereby said backend infrastructure may transfer a lease key to said primary mobile device, said lease key comprising a dataset capable of decrypting data and code sections stored on said primary mobile device for a limited period of time; and
 obtaining said lease key whereby, when said primary mobile device connects to said backend infrastructure and requests said lease key, said backend infrastructure will grant or deny said request based upon a successful response by the mobile device accessory to an authentication challenge from the primary device, said response and authentication challenge being part of a challenge response protocol between the primary mobile device and the mobile device accessory which is managed by the backend infrastructure.

8. The method of claim 7 whereby the step of connecting said mobile device to said backend infrastructure comprises establishing an internet connection between said primary mobile device and said backend infrastructure.

9. The method of claim 8 further comprising the step of generating a temporary renewed lease key when said internet connection cannot be established.

10. The method of claim 8 further comprising the step of temporarily extending the expiration of said original lease key when said internet connection cannot be established.

11. The method of claim 7 whereby said step of obtaining a lease key comprises a seed containing challenge by said primary mobile device to said mobile device accessory to respond to said primary mobile device; a response to said challenge by said mobile device accessory to said primary mobile device based on the seed being applied to an algorithm shared by the primary mobile device and the mobile device accessory; and sending said response through said connection means to said backend infrastructure.

12. The method of claim 11 whereby said step of obtaining a renewed lease key further comprises the step of developing an environment signature and sending said environment signature to said backend infrastructure with said request for said lease key.

13. A method on a system for securing data on a mobile device, said system comprising a network;
 at least one backend infrastructure comprising a server located behind a firewall attached to said network, said server having machine readable storage having stored thereon data and a plurality of code sections executable by a machine, said code sections comprising a plurality of applications, said server further comprising data identifying associations between at least a primary mobile device, at least one mobile device accessory, and a user;
 at least one primary mobile device comprising a machine readable storage having stored thereon data and a plurality of code sections executable by a machine for communicating with said server, at least one of said data or code sections being encrypted;
 at least one mobile device accessory comprising a machine readable storage having data stored thereon; the method for securing data on said at least one primary mobile device comprising the steps of:
 generating and situating on said primary mobile device a lease key capable of identifying said primary mobile device and said at least one mobile device accessory, and capable of decrypting said at least one encrypted application and encrypted data on said primary mobile device, said lease key comprising a time-limited activation lease period and limited activation extension parameters;
 upon attempting to access said at least one encrypted application or encrypted data following the expiration of said time-limited activation lease period, gathering information regarding said primary mobile device and said mobile device accessory and attempting to establish a network connection with said server where the gathered information contains various defined authentication factors to which varying positive or negative evidentiary weights are assigned;
 and if a connection is established, sending said gathered information and a request to authenticate a new lease key to said server;
 said server receiving and comparing said information with association information maintained in said server database to determine whether said information is sufficient to authorize a new lease key to be sent to said primary mobile device;
 and if, based on the weighted evidence, said information is sufficient to authorize a new lease key, sending said lease key to said primary mobile device;
 and if said comparison mandates a refusal of authentication, notifying said primary mobile device that said authentication request is refused;
 and if, based on the weighted evidence, said information is not sufficient to authorize a new lease key to be sent to said primary mobile device, notifying said primary mobile device that additional authentication information is needed;
 gathering and sending additional authentication information from said primary mobile device to said server for further comparison; and if a connection is not made to said server, comparing said gathered information to association information obtained from said lease key;

and if said comparison shows sufficient correlation between said gathered information and said association information, determining whether said limited activation extension parameters are satisfied;

and if said limited activation extension parameters are satisfied, granting access to said one or more encrypted applications and encrypted data with said lease key in accordance with said limited activation extension parameters;

and if said one or more limited activation extension parameters are not satisfied, denying access to said one or more encrypted applications and encrypted data.

* * * * *

UNITED STATES PATENT AND TRADEMARK OFFICE
Certificate

Patent No. 8,402,552 B2                  Patented: March 19, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Arvind Goyal, Sudbury, MA (US); Joseph Muthian George, Boston, MA (US); and John Arnold, West Borough, MA (US).

Signed and Sealed this Twenty-seventh Day of May 2014.

GILBERTO BARRON, JR.
                                                           *Supervisory Patent Examiner*
                                                                      Art Unit 2432
                                                             Technology Center 2400